United States Patent [19]

Dawson

[11] 3,726,122
[45] Apr. 10, 1973

[54] SWAGING TOOL
[75] Inventor: James A. Dawson, Hazelwood, Mo.
[73] Assignee: McDonnell Douglas Corporation, St. Louis County, Mo.
[22] Filed: Mar. 10, 1971
[21] Appl. No.: 122,915

[52] U.S. Cl. .........................72/412, 29/237, 72/453
[51] Int. Cl. ..............................................B21d 41/00
[58] Field of Search....................72/412, 14, 15, 453; 29/237

[56] References Cited

UNITED STATES PATENTS

| | | | |
|---|---|---|---|
| 3,048,212 | 8/1962 | Morrison | 29/237 |
| 1,782,219 | 11/1930 | Wallace | 29/237 |
| 2,676,391 | 4/1954 | Elder | 29/237 |
| 3,299,496 | 1/1967 | Christensen | 29/237 |
| 3,373,474 | 3/1968 | Doerer | 29/237 |

Primary Examiner—Charles W. Lanham
Assistant Examiner—Gene P. Crosby
Attorney—Gravely, Lieder & Woodruff

[57] ABSTRACT

The swaging tool performs the swaging operation by moving axially along a fitting sleeve to join the sleeve to a conduit inserted in the sleeve. The tool includes a support for the fitting and for a swaging die, leverage arms extending from the supports, and force applying means connected between the leverage arms to move the arms in directions relative to each other to move the swaging die axially along the fitting sleeve to radially swage the sleeve onto the end portion of the conduit located within the sleeve. The force applying means include means to control the movement of the leverage arm so the swaging die does not deviate substantially from axial travel.

9 Claims, 8 Drawing Figures

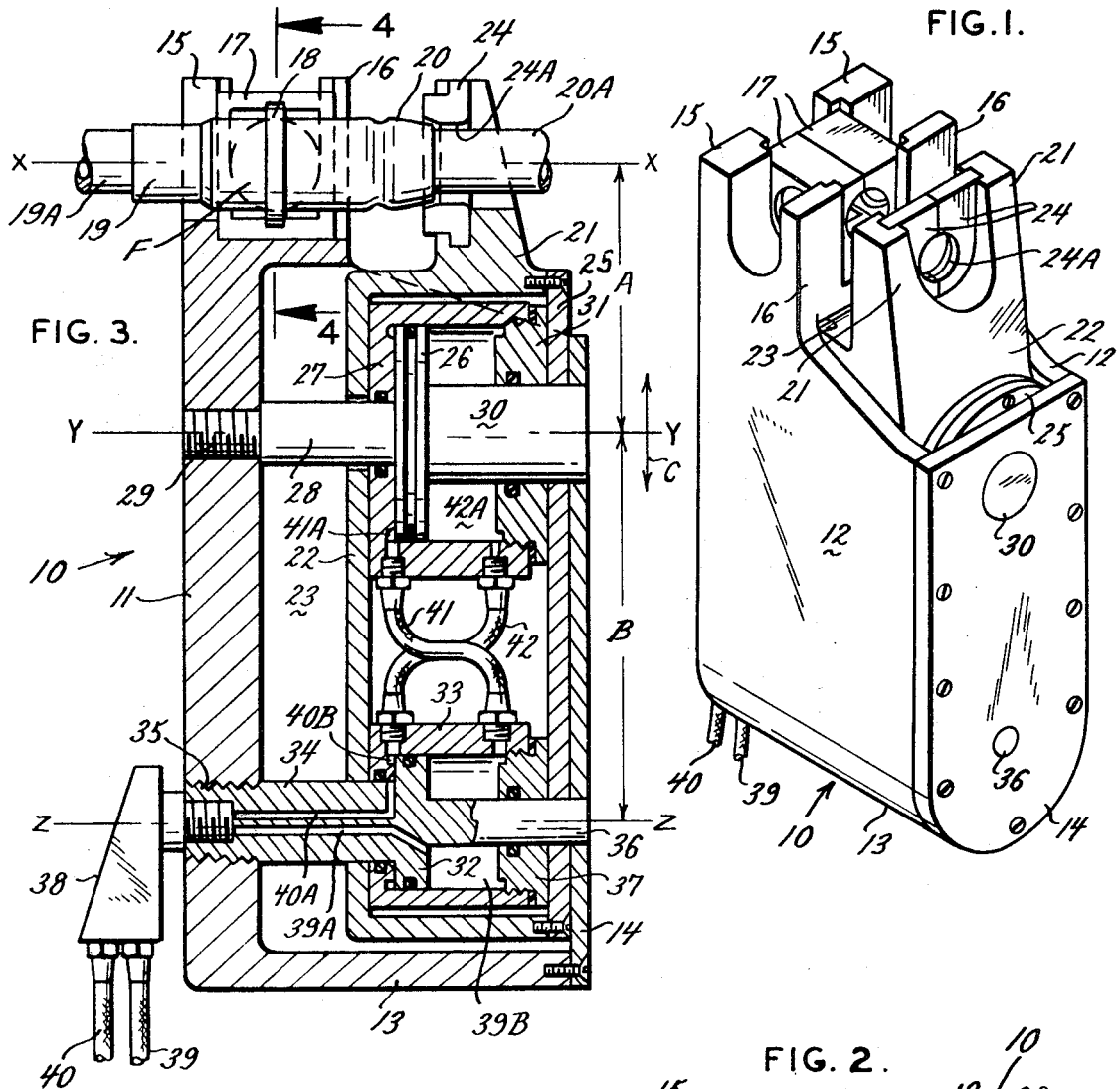
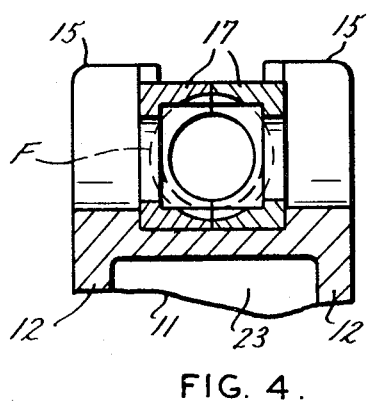
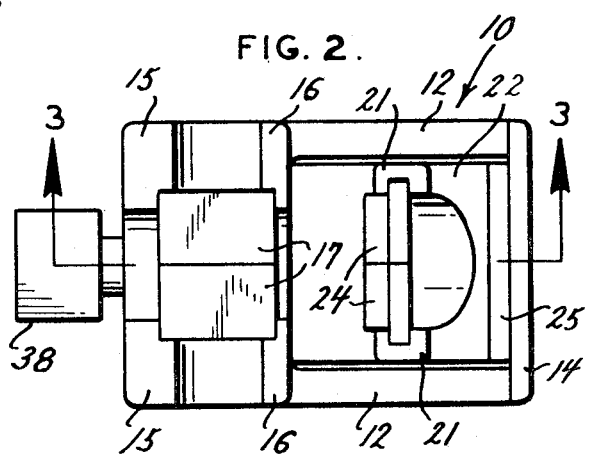
INVENTOR
JAMES A. DAWSON

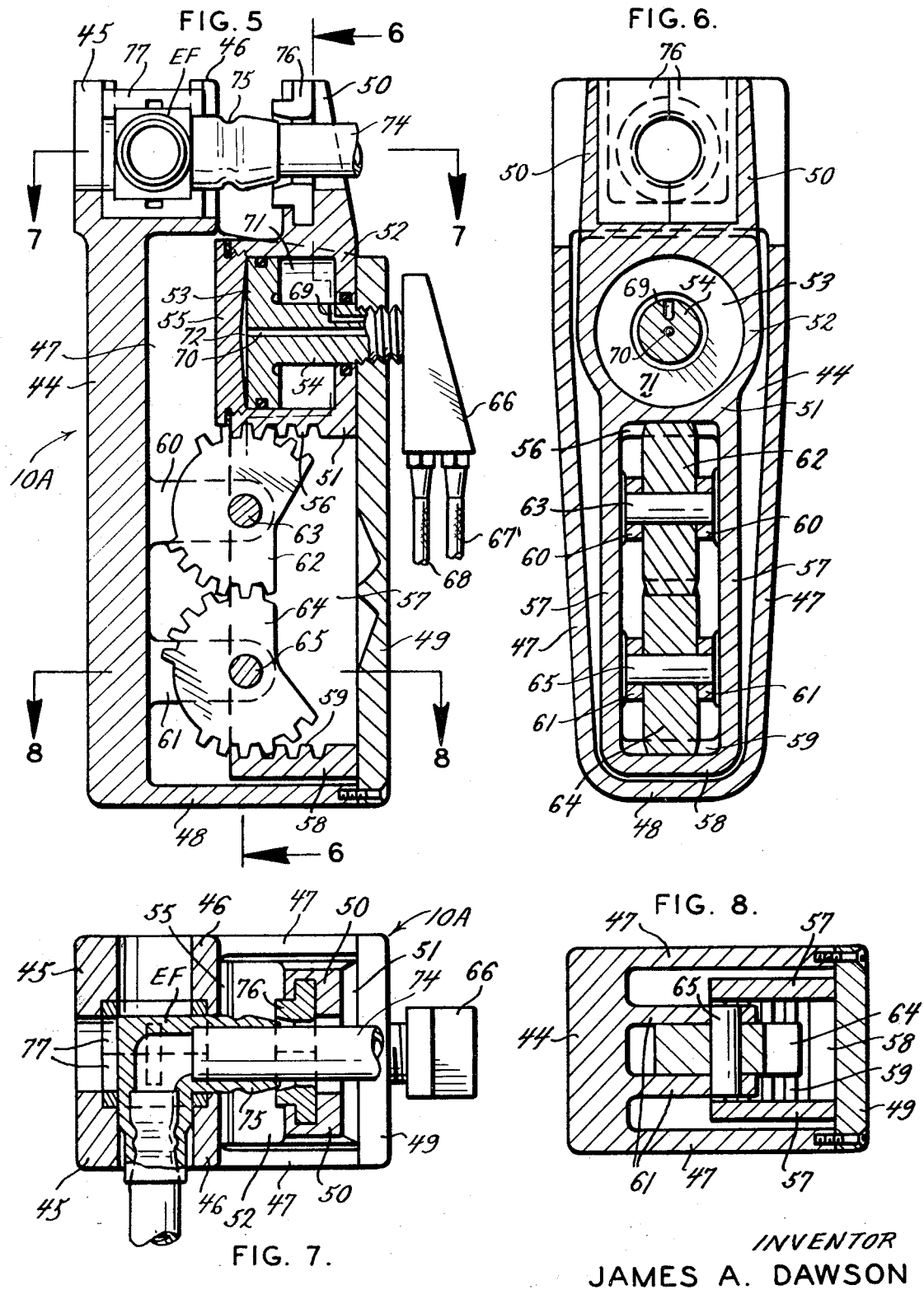

SWAGING TOOL

SUMMARY OF THE INVENTION

This invention is concerned with a swaging tool of small or miniaturized size but capable of applying enormous forces on fittings to swage the same onto tubes in confined areas such as are common in aircraft.

The manufacturing of precision and highly sophisticated products as aircraft requires substantially perfect results because these vehicles cannot afford any failure or tolerances for errors. It is especially true that aircraft controls must work with certainty every time, and the transmission lines carrying pilot commands to the flight surfaces and other vital components must have the highest reliability and service life. With these high standards in mind, it is necessary to gain perfection in installing hydraulic transmission conduits through areas where space is tight and working room is at a premium.

With these demands in mind it will become evident that the usual threaded connections in high pressure fluid carrying lines can no longer be relied upon. A solution is found in replacing threaded conduit fittings with swaged fittings which are installed by performing the swaging operations in the final positions notwithstanding the lack of space to perform the swaging operation. Thus, the problem has been to obtain a swaging tool small enough to be manually operated in the small areas where conduit connections must be made.

The swaging tool hereinafter to be described is the answer to this want, which is a small and compact tool capable of being operated while held by hand and with the ability to exert force of the order required to swage a fitting and tube into a permanent connection with such assurance that failure is practically eliminated. In the swaging operation of the tool a pair of jaw members are required to engage the fitting and squeeze the fitting into the tube so that the two parts assume a unitary relationship without the generation of destructive heat or causing surface defects that can be the site of cracks and fatigue failures.

A preferred embodiment of tool for axially swaging a fitting onto a conduit comprises a fixed jaw member capable of firmly holding the fitting, a movable jaw member carrying a swaging die which causes the desired swaging result, and powered means to move the jaw members relative to each other in a true direction axially of the fitting and conduit so that uniform wall thickness and absence of kinks and destructive defects is assured. The tool operates to draw a split swaging die axially over the fitting sleeve to deform and compress the sleeve over the conduit. Such a tool requires tremendous power and this power must be exerted precisely and with complete safety to the worker who manipulates the tool. The problem then is to control the application of the power applied to the swaging die so that a true axial movement is achieved, and to guard the moving parts so that there is no hazard to the operator.

In one embodiment hydraulic power is exerted on the swaging jaw members through a power piston and cylinder device located at one side of the fitting, and a force feedback system is provided through rack and gear means to maintain the stroke of the piston and cylinder parallel to the fitting within the required tolerance for desired swaging results. In another embodiment the stroke of the power piston and cylinder is balanced by a second piston and cylinder which maintains the motion or travel of the swaging die parallel to the fitting sleeve by shifting the effective lever arm of the power piston and cylinder to maintain a torque balance through a force feed back system.

BRIEF DESCRIPTION OF THE DRAWINGS

The preferred embodiments of this invention are shown to advantage in the accompanying drawings, wherein:

FIG. 1 is a perspective view of the swaging tool of this invention showing the jaw members and means to engage the fitting and the swaging die;

FIG. 2 is a view from the top of the swaging tool seen in FIG. 1;

FIG. 3 is a longitudinal sectional view of the swaging tool taken at line 3—3 in FIG. 2;

FIG. 4 is a fragmentary sectional view of the split base block for engaging the fitting, the view being taken at line 4—4 in FIG. 3;

FIG. 5 is a longitudinal sectional view of a swaging tool showing a modified embodiment;

FIG. 6 is a longitudinal sectional view taken at line 6—6 in FIG. 5;

FIG. 7 is another sectional view seen at line 7—7 in FIG. 5; and

FIG. 8 is yet another sectional view seen at line 8—8 in FIG. 5.

DESCRIPTION OF THE FIG. 3 EMBODIMENT

One of the preferred embodiments of the swaging tool is seen in FIGS. 1 to 4 and reference is directed to those drawings, and especially FIG. 3. The swaging tool 10 has a casing member having a sturdy base wall 11, spaced side walls 12, a bottom wall 13, and a removable closure wall 14. The upper end portion of the base wall 11 is formed with bifurcated jaw members 15 and 16 so as to provide openings on each of the four sides for receiving fittings that may be straight sleeves, elbows, or multiple sleeve fittings. The jaw members 15 and 16 are adapted to receive a split base adapter 17, such as that seen in FIGS. 3 and 4, in which is a straight fitting F having a central body peripheral flange 18 and oppositely directed sleeves 19 and 20. The sleeve 19 is swaged onto a tube 19A and the sleeve 20 is about to be swaged onto a tube 20A. In the view of FIGS. 1 and 3, the jaw members 15 and 16 on the base wall 11 are stationary.

A relatively movable bifurcated jaw member 21 projects upwardly out of the casing from a jaw body 22 which floats in the interior space 23 of the casing. The jaws 21 receive a split swaging die 24 having the throat 24A surrounding the tube 20A and adapted to sweep over the fitting sleeve 20 to swage the sleeve onto the tube as has been completed for sleeve 19 and tube 19A.

The jaw body 22 is hollow and has a closure plate 25 to enclose a power piston 26 mounted in the cylinder 27. The piston 26 is formed with a piston rod 28 projecting through the body 22 so as to be threadedly engaged at 29 in the base wall 11 of the tool casing. A guide rod 30 projects oppositely from the power piston 26 and is mounted in the closure plates 25 and 14. The cylinder 27 has an open end to initially receive the piston, and a closure plug 31 is mounted in the cylinder. The lower end of the jaw body 22 contains a torque balancing piston 32 in a cylinder 33. The piston 32 has a rod 34 projecting through the body 22 for threaded connection at 35 in the casing wall 11, and an oppositely extending guide rod 36 projecting through the closures 25 and 14. The cylinder 33 is provided with a closure plug 37. In this manner of assembly, and using suitable O-ring seals, the cylinders 27 and 33 with the closure plugs 31 and 37 respectively are securely captured in the jaw body 22 upon placement of the closure plate 25. This manner of assembly allows the jaw body 22 to float back and forth on the respective piston rods 28 and 34, using the guide rods 30 and 36 to maintain a straight line motion.

Pressure fluid to the cylinders is supplied through an external adapter 38 connected into the end 35 of the piston rod 34. Thus, the fluid line 39 connects into passage 39A which opens to the cylinder space 39B, while the line 40 connects into passage 40A in rod 34 and opens to the cylinder space 40B opposite space 39B. In FIG. 3, the cylinder 33 has its space 39B connected by a conduit 41 to the space 41A of cylinder 27, and a second conduit 42 connects space 40B of cylinder 33 to the space 42A of cylinder 27. The lines 39 and 40 may have either supply and exhaust functions, depending on the direction of movement desired for the jaw member 22.

OPERATION OF THE FIG. 3 EMBODIMENT

The operation of the swaging tool seen in FIG. 3 is initiated after the fitting F has been properly mounted in the split base blocks 17 and the swaging split die 24 is mounted in the jaw bifurcations 21. Admission of pressure fluid at line 39 charges cylinder space 39B in the torque balancing cylinder 33 and by conduit 41 charges the space 41A of the power cylinder 27. Thus, the cylinder 33 is charged with pressure fluid oppositely to the power cylinder 27 for the purpose of creating a torque balancing force directly related to the resistance encountered by the swaging die 24 on the fitting sleeve 20.

An analysis of the forces and moment arms will make it evident that the load on the swaging dies 24 acts along the axis line X which is at the distance A from the thrust axis Y of the power cylinder 27. At the same time the torque balancing cylinder 33 has its thrust axis Z spaced the distance B from the thrust axis Y of the power cylinder 27. The load on the swaging dies 24 acts rightwardly in FIG. 3 as does the thrust of the balancing cylinder 33 along axis Z. The power cylinder 27 exerts its thrust leftwardly along axis Y. Thus, the floating jaw member 22 acts as a beam with a driving force acting along the axis Y and resistance forces acting oppositely along axes X and Z. At the initial application of the power fluid from line 39 unequal and opposing forces at cylinders 33 and 27 cause slight torque on floating jaw member 22 which is due only to friction since no swaging force is yet applied.

This torque on moving jaw 22 is readily absorbed by piston rods 28, 30, 34 and 36. Should friction or minor torque unbalance during swaging action be of a magnitude sufficient to tend to tilt the jaw member 22 relative to the face of the power cylinder 27, the effective thrust axis Y of this cylinder, namely the point of application of force to jaw member 22, will shift in the direction of arrow C so that the tilt will be corrected by changing the effective lengths of the moment arms A and B. Thus, the action of the cylinders 27 and 33 on the jaw beam member 22 will automatically compensate for the torque affects which tend to cause the swaging die axis X to move out of parallel with the intended thrust axis Y.

The balance cylinder 33 provides compensating torque on the moving member 22 such that this member may be considered as floating on two pressure fluid columns. The force exerted by the power cylinder 27 must be equal and opposite to the sum of the swaging force at die 24 and the force at the balancing cylinder 33, except for friction effects in the system. This unique torque adjustment controls the motion of the swaging die to keep it on a path following the axis of the fitting sleeve 20. The power cylinder 27 and balance cylinder 33 float in the body 22 of the jaw member carrying the swaging die 24. The pressure fluid supply from line 39 acts in the balance cylinder 33 opposite to the action in the power cylinder 27 due to the manner of connecting the lines 41 and 42. As a consequence, any tendency of the jaw members 11 and 22 to deviate from relative parallel movement causes a shift in the force application point between the face of cylinder 27 and the body 22. This shift in force application changes the effective leverage arms of the cylinders 27 and 33 sufficiently to restore torque balance. This is important when considering load magnitudes of more than 13 thousand pounds delivered to the swaging die 24 along the axis of sleeve 20 by the application of 20-thousand pounds delivered at the power cylinder 27. The balance cylinder 33 acts by delivering its force through the closure 37 to the plate 25 and into the jaws 21 carrying the split swaging die 24.

When the swaging of sleeve 20 is completed the fluid supply is reversed at lines 39 and 40 so that line 40 becomes the supply side to drive the floating member 22 rightwardly. This is important as the swaging dies 24 will usually permit the end of the fitting sleeve 20 to blossom radially. The withdrawal force applied on member 22 will sweep the swaging dies 24 to the right to compress the blossom and smooth off the sleeve end.

DESCRIPTION OF THE FIG. 5 EMBODIMENT

In the several views of FIGS. 5 to 8 there is shown an embodiment having the principles of the tool of FIG. 3. In this embodiment the tool 10A includes a casing formed with a sturdy base wall 44 surmounted by bifurcated jaws 45 and 46, spaced side walls 47, a bottom wall 48, and a removable closure plate 49. The casing is open between the side walls 47 adjacent the jaws 46 to allow the projection of bifurcated jaws 50 on a movable jaw operating member 51 disposed in the casing of the tool.

The member 51 (FIGS. 5 and 6) has an enlarged portion forming a cylinder 52 for the reception of a stationary piston 53 fixed by the rod 54 in the closure plate 49. The cylinder is provided with a closure head 55 for purposes of assembly, and suitable O-ring seals are employed as required. A gear rack 56 is formed on the cylinder between spaced arms 57, and the arms are connected at the lower ends by a portion 58 in which is formed a gear rack 59. The racks 56 and 59 are located in facing relation at opposite ends of the slotted space between the arms 57 of the jaw operating member 51.

The base wall 44 of the tool casing is formed with a pair of forks 60 and 61 projecting into the slotted space between arms 57. The forks 60 support double sector gear 62 on a shaft 63, and forks 61 support a similar double sector gear 64 on a shaft 65. The gears 62 and 64 have the teeth interrupted as shown, and meshing engagement is made between the gears 62 and 64, between gear 62 and rack 56, and between gear 64 and rack 59. A pressure fluid connector 66 for the fluid lines 67 and 68 is attached to the piston rod 54 to supply fluid to the conduits 69 and 70. Fluid supplied to conduit 69 and cylinder space 71 will move the jaws 50 to a position shown in FIG. 5, and fluid displaced from the opposed cylinder space 72 will flow out through conduit 70. The lines 67 and 68 may be connected through connector body 66 so as to be in fluid flow relationship with the conduits 69 and 70 respectively. Movement of the cylinder 52 to the left (FIG. 5) will cause the rack 56 to rotate sector gear 62 in a counterclockwise sense thereby rotating sector gear 64 in a clockwise sense and imparting a leftward thrust on rack 59. The stroke of the racks 56 and 59 must therefore, be the same and thus the split swaging die jaws 50 will be caused to move in a path coincident with (and parallel to) the axis of the tube 74 to be swaged into the sleeve 75 of elbow fitting EF by the split swaging die 76 carried in the jaws.

OPERATION OF THE FIG. 5 EMBODIMENT

The views of FIGS. 5 and 7 reveal that the elbow fitting EF is mounted in a split base adapter 77 so that sleeve 75 extends toward the swaging die 76 and the conduit 74. The end portion of conduit 74 is passed into the sleeve 75 a desired distance to obtain a secure swage. Pressure fluid at line 68 flows through conduit 70 in the fixed piston and into space 72 thereby forcing the cylinder 52 to move leftwardly. Such motion will bring the swaging die 76 into engagement with the outer end of sleeve 75 and could cause the lower end 58 of the member 52 to move more rapidly to the left. However, the meshing sector (or interrupted) gears 62 and 64, being carried on the wall 44 and meshing with the racks 56 and 59 will not allow the bottom portion 58 to get ahead of the rest of the member 51. A substantially straight line motion for the die 76 is the necessary result of the mechanism herein described.

In the operation of the tool as shown in FIG. 5, it has been pointed out that the pressure fluid admitted to the cylinder space 72 will displace the jaw actuating member 51 leftwardly, and this motion will cause the split swaging die 76 to engage the fitting sleeve 75 with the initial result that the bottom end 58 of the member 51 will want to move leftwardly faster than the swaging die 76. The unique arrangement of the gears 62 and 64 and the respective racks 56 and 59 controls the displacement of the jaw actuating member 51 so that the entire member will move in a substantially straight line path. The tendency for the bottom 58 of the member 51 to move leftwardly faster than any portion of the member there above will tend to drive the sector gear 64 in a clockwise direction, and this will tend to drive the sector gear 62 in a counterclockwise direction which will inevitably result in a leftward force being applied to the power cylinder 52. Thus, force feedback takes place from the bottom rack 59 through the gears 64 and 62 to the inner rack 56. It can now be appreciated that as the force exerted by the power cylinder 52 increases on the swaging die 76, there will be an increasing feedback of force from the bottom rack 59 through the sector gears to the inner rack 56, thereby applying the full cylinder force, except for friction losses, to the swaging die and maintaining motion of the swaging die 76 along a path coincident with the axis of the fitting sleeve 75 which is to be swaged onto the inserted end portion of conduit 74. By reversing the pressure fluid supply so as to feed the pressure fluid into cylinder space 71 through conduit 69 the bifurcated jaws 50 are retracted and moved rightwardly. The force feedback mechanism above described, and comprising essentially meshing sector gears and racks, will correct any tendency of the bottom portion 58 of the jaw actuating member 51 to move faster to the right, whereby the swaging die 76 will be withdrawn from the fitting sleeve 75 with sufficient force to assure a swaging down or smoothing off of any extruded blossom that may have been raised at the outer lip of the sleeve 75 on the initial swaging pass of the swaging die 76.

RESUME

The foregoing description of swaging tool embodiments of FIGS. 3 and 5 set forth the general principles of operation of a tool that is extremely compact so as to be easily manipulated manually, sufficiently powerful to successfully swage fittings in place in tight areas where space is at a premium and where power tools must be manually manipulated, and in which the path of travel of the swaging die is effectively controlled by unique means that continually monitor the force of the main power cylinder and sense the need for force feedback to the power cylinder for correcting the tendency of the swaging die to deviate from the desired axial or straight line path of motion which is intended to be coincident with and substantially parallel to the axis of the fitting sleeve to be swaged. In the case of the tool of FIG. 3, the force feedback from the balancing cylinder 33 causes a deviation of engagement of the face of the power cylinder 27 on the member 22, thereby changing the moment arm between the axes X and Y by moving the force application point, namely the effective axis Y, relative to axis X in the direction of the arrow C. Such response will occur when the balancing cylinder is exerting a greater or lesser force than is required to maintain the swaging die 24 in its axial path.

The tools herein described have been found versatile to the extent that swaged joints may be produced in steel, titanium, aluminum, and other types of metals or combinations of metals where a permanent joint is to be established. It is a feature of the present swaging tools that several different sizes of swage dies may be utilized and still keep within the maximum swaging force capabilities.

What is claimed is:

1. A tool for axially swaging a fitting onto a tubular conduit the fitting and conduit having a common alignment axis, comprising jaw means to receive a fitting, a first member supporting said jaw means and having a body extending to one side of the alignment axis of the fitting and conduit, a second member mounted in said body of the first member, swaging die means carried on said second member in position to move in said alignment axis and to engage the fitting, force applying means operatively supported by said first and second members and including a primary source of power operative along an axis parallel to and off-set to said one side of the alignment axis of the fitting and conduit, and a secondary power source operative along an axis off-set from and parallel to said alignment axis of the fitting and conduit, said secondary power source being effective to maintain said primary power source operating along said operating axis which is parallel with said alignment axis.

2. The tool of claim 1 wherein said secondary power source is located farther to one side of the alignment axis than is said primary power source, said secondary power source exerting its power in opposition to said primary power source.

3. The tool of claim 1 wherein said force applying means includes guide means in said first member having axes substantially parallel with said alignment axis, and said second member moves upon said guide means.

4. The tool of claim 3 wherein said jaw means and swaging die means, said primary power source and said secondary power source are disposed side by side and in substantial parallelism in the same plane with said jaw and swaging die means at one side and said secondary power source at the opposite side of said primary power source.

5. The tool of claim 4 wherein said second member moves freely in said first member such that deviation from parallelism between said jaw and swaging die means and said primary power source changes the moment arm length therebetween and said moment arm change exerts power feedback through said second member from said secondary power source to balance the power exerted by said primary and secondary power sources for retention of parallelism.

6. In a tool for swaging tubes into fittings, the improvement which comprises a first swaging member having an axis along which swaging takes place, a swaging force transmitting arm extending to one side of said first swaging member a second swaging member having an axis coincident with said first axis, a swaging force reaction arm extending to one side of the coincident axis and positioned adjacent said force transmitting arm, said arms normally being substantially parallel; power operated means operable on said force transmitting arm to drive said first swaging member toward said second swaging member; and means operably connected to said force transmitting arm to maintain said arms normally parallel, said last means operating to sense said first and second swaging members moving out of axial coincidence and adjust said power operated means.

7. The improvement of claim 6 wherein said power operated means is spaced from said swaging members a predetermined distance to establish a moment arm, and said means operably connected to said force transmitting arm is spaced from said swaging members a different predetermined distance to establish a moment arm different from said first moment arm.

8. The improvement of claim 6 wherein said means operably connected to said force transmitting arm monitors the motion of said swaging members and balances the acting forces in the tool to assure swaging along a path substantially parallel to the axis of the tube and fitting.

9. The improvement of claim 6 wherein said means operably connected to said force transmitting arm includes a rack and gear device operative on said force transmitting arm to monitor arm motion deviations from the swaging axis and reduce said deviation to substantially zero.

* * * * *